United States Patent [19]

Johansson

[11] 4,333,547

[45] Jun. 8, 1982

[54] CLIMBING DEVICE FOR VEHICLES

[76] Inventor: Gustav I. Johansson, Korpvägen 9, S-826 00 Söderhamn, Sweden

[21] Appl. No.: 136,253

[22] Filed: Apr. 1, 1980

[51] Int. Cl.³ .............................................. E06C 5/26
[52] U.S. Cl. ...................................... 182/90; 182/93; 182/196; 182/219
[58] Field of Search .............................. 182/196–199, 182/91, 90, 93, 228, 220, 46, 219

[56] References Cited

U.S. PATENT DOCUMENTS

| 110,476 | 12/1870 | Knowlton | 182/196 |
| 3,083,785 | 4/1963 | Hyman | 182/196 |
| 3,603,429 | 9/1971 | Shepherd | 182/91 |
| 3,887,216 | 6/1975 | Perry | 182/90 |
| 3,967,695 | 7/1976 | Waddell | 182/90 |
| 4,054,298 | 10/1977 | Urbaitis | 182/90 |
| 4,054,299 | 10/1977 | Urbaitis | 182/90 |
| 4,144,683 | 3/1979 | Dean | 182/93 |
| 4,146,941 | 4/1979 | Haslam | 182/91 |

FOREIGN PATENT DOCUMENTS

| 250646 | 5/1963 | Australia | 182/219 |
| 2816971 | 4/1978 | Fed. Rep. of Germany | 182/196 |

*Primary Examiner*—Reinaldo P. Machado
*Attorney, Agent, or Firm*—Charles E. Brown

[57] ABSTRACT

A ladder for use with vehicles is composed of two flexible supporting members and a number of foot steps, said supporting members comprising a reinforcement located in the vicinity of that face of the member which is directed outwardly from the vehicle so as to give said member a greater resistance to bending in the direction of the vehicle than in the opposite direction. According to another aspect of the invention each foot step at the opposite ends thereof is pivotally connected to brackets mounted in the flexible supporting members.

8 Claims, 5 Drawing Figures

CLIMBING DEVICE FOR VEHICLES

BACKGROUND AND SUMMARY OF THE INVENTION

This invention relates to a climbing device for vehicles comprising a number of foot steps arranged on a frame composed of one or more supporting members which are made of flexible material in order to allow temporary deformation of the frame without causing permanent damages therein if striking an obstacle. Such a climbing device, which is advantageously used in connection with tractors, earth moving scrapers and similarly high vehicles, is previously known by the U.S. Pat. No. 3,887,216 which discloses a device comprising one single foot step and two supporting bodies in the form of portions of a single rubber strap. These supporting members are of rectangular cross sectional shape providing a greater resistance to bending perpendicularly to a plane through the device than parallel to said plane in order to make said members yield easier for strains acting laterally on the device than for strains acting perpendicularly to the plane of the device. When examined in the latter direction only, each supporting member is however as apt to yield inwardly towards the vehicle as it is apt to yield outwardly therefrom. In practice this means that the foot step rather easily moves inwardly towards the vehicle when a person gets up on it and thereby the climbing operation is felt unpleasant and unsafe. Such inward movement may also injure the legs and knees of the climbing person in question.

A climbing device consisting of a single foot step and two supporting chains is further known by the British Pat. No. 1,485,929. Also in this case the supporting members are as apt to yield inwardly towards the vehicle as outwardly therefrom. As a matter of fact the supporting chains of this device is equally yieldable in all directions.

It is an object of the present invention to eliminate the disadvantages of the prior art devices and provide a climbing device or ladder which guarantees a safe and steady climbing at the same time as the frame or the supporting members of the device are free to yield in those directions which are essential in order not to damage said members when striking an obstacle. According to one aspect of the invention this is achieved by the fact that the supporting member in question comprises a reinforcement located in the vicinity of that face of the member which is directed outwardly from the vehicle in order to provide said member with a greater resistance to bending in the direction of the vehicle than in the opposite direction.

According to another aspect of the invention each foot step arranged between two parallel, preferably long supporting members is pivotally connected at the opposite ends thereof to brackets mounted in the supporting members. By this pivotal connection no detrimental breaking movements are transferred from the foot step to the supporting members when the frame as a whole is deflected upon striking the ground or the obstacle.

BRIEF DESCRIPTION OF THE DRAWINGS

An embodiment of the climbing device or ladder according to the invention will now be described with reference to the accompanying drawings, in which.

DETAILED DESCRIPTION OF THE INVENTION

Figure 1:
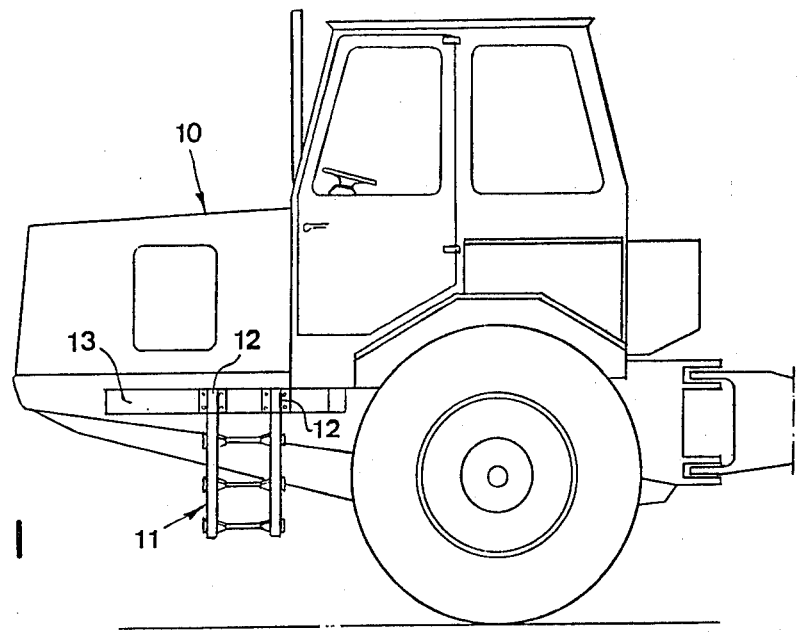
FIG. 1 is a side elevational view of the front portion of a vehicle provided with a ladder of the invention.

The vehicle 10 of FIG. 1 is provided with a ladder 11 according to the invention. This ladder is fixed by means of holders 12 attached to a platform 13 of the conventional type existing on the vehicle. In the present case the vehicle is shown as a forest tractor. This does not however mean that the ladder of the invention could not be used in connection with other vehicles, such as trucks, earth moving scrapers, etc. The details of the ladder appear from FIGS. 2 to 5 to which reference is now made.

Figure 2:
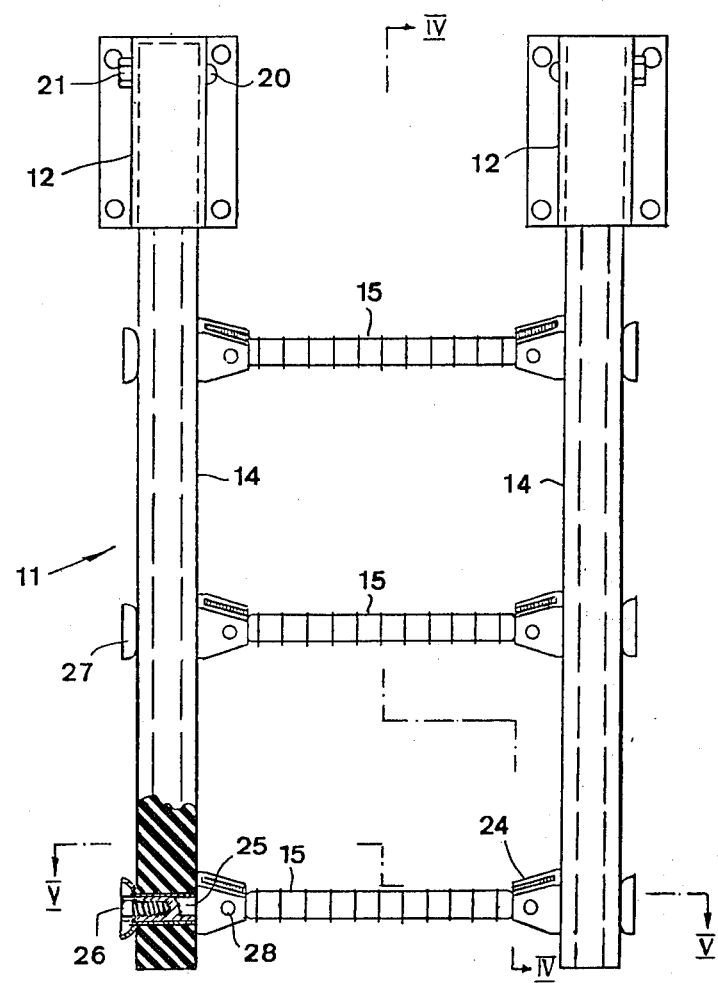
FIG. 2 is an enlarged side elevational view of the ladder of FIG. 1.

As seen in FIG. 2 the ladder 11 comprises two rather long supporting members 14 consisting of a flexible or resilient material, especially crude or synthetic rubber. Instead of rubber it is also conceivable to use different types of plastics having a suitable resiliency.

A number of foot steps or cross pieces 15 extend between the two supporting members 14. In the embodiment shown in the drawing the number of foot steps is three but it should be understood that the number in question may be varied all from one and upwards.

Figure 5:
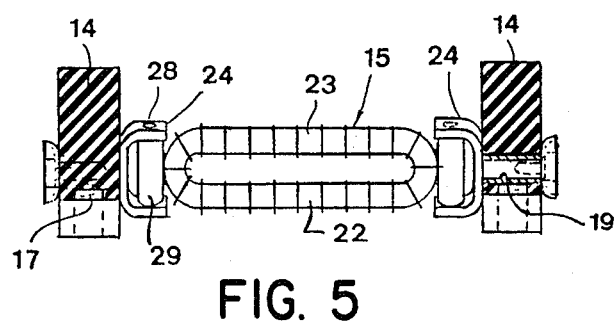
FIG. 5 is a horizontal sectional view taken along the line V—V of FIG. 2.

As best illustrated in FIG. 5 the supporting members 14 have a substantially greater extension perpendicularly to a plane through the foot steps 15 than parallel to said plane. In other words the supporting members have a width or depth which is greater than the thickness thereof. In practice the width/thickness ratio may be 2:1 or greater. In this manner the supporting members get a greater resistance to bending perpendicularly to the imaginary plane through the foot steps than in said plane itself. Accordingly the supporting members yield considerably easier for strains directed substantially parallel to the direction of movement of the vehicle than perpendicularly thereto.

Figure 3:
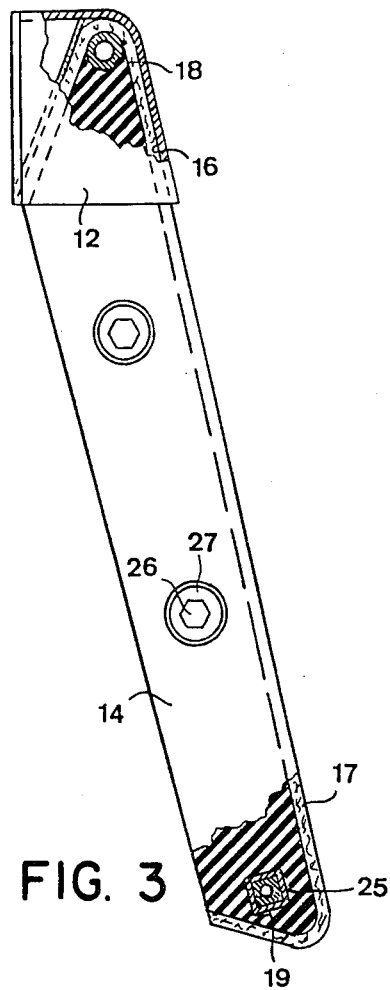
FIG. 3 is an elevational view of the ladder as seen from the left in FIG. 2, parts of the ladder being broken away in order to illustrate the structure of an supporting member.

FIG. 3 illustrates how the supporting members 14 are arranged in the holders 12 in such a way that they slope outwardly and downwardly from the vehicle or the platform thereof. This has been carried out by the fact that the holder 12 is made with a downwardly opening seating 16 the inside shape of which rather accurately corresponds to the outside shape of the top portion of the supporting member in question, said member automatically assuming said sloping position as it is inserted in said seating of the holder. In the embodiment shown the angle of inclination relative to the vertical plane is about 15°. This angle may however vary within wide limits, e.g. from 5° to 45°, preferably 10° to 30° or 15° to 20°.

In order not to allow the individual supporting member to deflect downwardly too easily when loaded by a person standing on the ladder the same is provided with a reinforcement in the shape of a textile strap 17 which is embedded in or otherwise connected to that face of the supporting member which is directly obliquely upwards or outwards rather than obliquely downwards or inwards. This textile reinforcement extends along the whole length of the supporting member and at the upper end of said member the reinforcement is folded over or arranged to enclose a sleeve 18 which extends across the length of the supporting member, said reinforcement being terminated not before it approaches the back side of the supporting member. At the lower portion of said member the reinforcement is similarly folded about a tube 19 and is terminated in the vicinity of the back side of the member. By the fact that the supporting member in this manner has a reinforcement on its front face the member in question is given a considerably greater resistance to bending downwardly or inwardly than to bending upwardly or outwardly; something that lends to the ladder a desirable stability for the person climbing the same.

The holder 12 may advantageously be made of metal sheet. In the two sheets which confine the seating 16 in the lateral direction holes are recessed the positions of which correspond to the position of the sleeve 18 when the supporting member is inserted in the seating. The supporting member is locked in the holder by means of a bolt 20 provided with a nut 21 (see FIG. 2).

Figure 4:
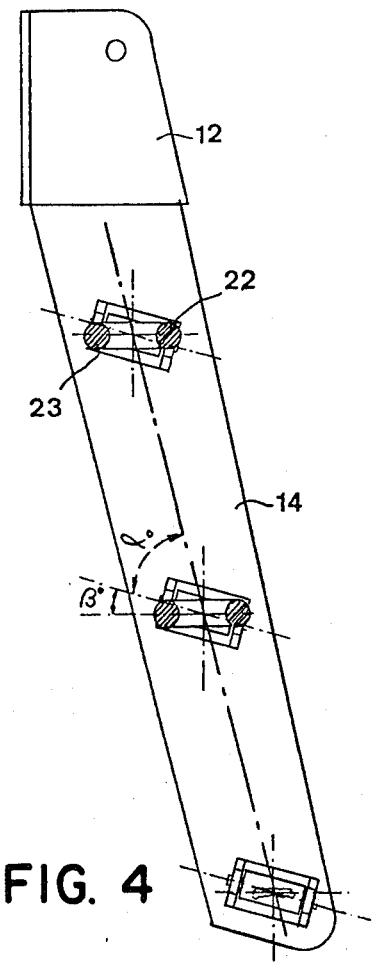
FIG. 4 is a sectional view taken along the line IV—IV of FIG. 2.

In the embodiment shown in the drawings each foot step comprises two separate, substantially parallel rods 22, 23 which are interconnected at their ends and lie in a substantially horizontal plane as illustrated in FIG. 4. According to an important aspect of the present invention each foot step is pivotally connected, at the opposite ends thereof, to brackets 24 mounted in the flexible supporting members 14. More exactly each of these brackets consists of a U-shaped yoke having a pin-like projection 25 which is inserted in the above mentioned tube 19 which in turn is embedded or anchored in the body of the flexible supporting member in question. The projection 25 and the bracket as a whole is secured in the tube by means of a locking element in the form of a screw 26 and a bowl-shaped washer 27. Each yoke 24 carries between the two free branches thereof an axle stub 28 on which a cage 29 is rotatably mounted. Said cage is in turn joined to the foot step 15 by welding.

The projection 25 as well as the tube 19 have a non-circular sectional shape so as to provide a non-rotatable connection between the supporting member on one hand and the bracket and the foot step on the other.

According to a further important feature of the invention the geometrical axis of the axle stub 28 is oblique in relation to the length of the frame body. In the embodiment shown the axle $\alpha$ is about 60°. In practice this angle may vary in the range of 50° to 80°. By arranging this angle between the stub axis and the length direction of each supporting member one lends to the ladder as a whole a stability which on one hand is great enough to avoid palpable lateral movements of the ladder upon climbing the same and on the other hand is not great enough to prevent the ladder from yielding upon striking an obstacle. If said axis were positioned perpendicularly to the length direction of the supporting members, then unpleasant lateral movements of the ladder would occur when even a light weight person climbs the ladder, but by making the angle $\alpha$ acute within the above mentioned range a good stability of the ladder is achieved in connection with climbing without however preventing the ladder from yielding when greater forces are involved in connection with the striking of an obstacle.

As previously mentioned the angle of inclination of the supporting members relative to the vertical plane is about 15° in the example, while the angle $\alpha$ is 60°. This means that there is also an angle $\beta$ of 15° between the substantially horizontal plane of the foot step and the cage 29 mounted on the stub 28. In other words said cage is welded to the end of the foot step while forming an angle determined by the angle of inclination of the ladder and the angle of inclination of the stubs 28 relative to the supporting members.

POSSIBLE MODIFICATIONS

Of course the invention is not merely limited to the embodiment disclosed in the drawings. Thus it is possible to apply the first aspect of the invention also to such climbing devices which instead of two individual supporting members or string members have one single frame or supporting member which is common to a plurality of foot steps projecting in opposite directions therefrom. Further it is possible to modify not only the holders for the supporting members in order to adapt the climbing device or ladder to different types of vehicles but also the foot steps which for instance may be made of plates or by simple rods instead of double rods as illustrated.

I claim:

1. A climbing device for vehicles, said climbing device comprising a number of foot steps arranged on a frame composed of one or more supporting members, said supporting members being made of flexible material to allow temporary deformation of said frame without causing permanent damages in said frame when striking an obstacle, said device having means at one end thereof for attachment to the vehicle in cantilever relation with the other end of said device being adapted to terminate freely spaced from the vehicle in outwardly displaced relation, said flexible supporting members including a reinforcement located in the vicinity of that face of said members which is directed outwardly from the vehicle in order to provide said members with a greater resistance to bending in the direction inwardly toward the vehicle than in the opposite direction.

2. A climbing device for vehicles, comprising a number of foot steps arranged on a frame composed of one or more supporting members which are made of flexible material in order to allow temporary deformation of the frame without causing permanent damages therein if striking an obstacle, characterized in that the supporting member comprises a reinforcement located in the vicinity of that face of said member which is directed outwardly from the vehicle in order to provide said member with a greater resistance to bending in the direction of the vehicle than in the opposite direction, said reinforcement, at an upper end of said flexible supporting member, being folded about a sleeve which extends across the length of said member and receives a locking bolt of a holder attached to the vehicle, said holder having a downwardly opening seating the inside shape of which corresponds to the outside shape of the top portion of said supporting members, and said top portion being inserted in said seating and locked therein by means of said bolt.

3. A climbing device for vehicles, said climbing device comprising a number of foot steps arranged on a frame composed of two supporting members, said supporting members being made of flexible material in order to allow temporary deformation of said frame without causing permanent damages in said frame when striking an obstacle, said members each having one end thereof attached to the vehicle while the other end of each member terminates freely spaced from the vehicle, each foot step being constructed as a stiff and rigid element, and said foot steps at the opposite ends thereof being pivotally connected to brackets mounted in said flexible supporting members.

4. A climbing device for vehicles, comprising a number of foot steps arranged on a frame composed of two supporting members which are made of flexible material in order to allow temporary deformation of the frame without causing permanent damages therein if striking an obstacle, characterized in that each foot step at the opposite ends thereof is pivotally connected to brackets mounted in said flexible supporting members, the axes about which said foot step pivots being oblique in relation to the length of said supporting members so as to lend to the climbing device as a whole a stability which on one hand is great enough to avoid palpable lateral movements of the device upon climbing the same and on the other hand is not great enough to prevent the device from yielding upon striking an obstacle.

5. A climbing device of claim 4, wherein the angle of inclination between said axis and the length of said supporting members is 50° to 80°.

6. A climbing device of claim 4, wherein said supporting members are attached to said vehicle in such a manner that they slope outwardly and downwardly therefrom at an angle of inclination differing from the angle of inclination between the pivot axes of the foot step and the length of said supporting member, the plane of said foot step and the pivot axes forming an angle with each other.

7. A climbing device for vehicles, comprising a number of foot steps arranged on a frame composed of two supporting members which are made of flexible material in order to allow temporary deformation of the frame without causing permanent damages therein if striking an obstacle, characterized in that each foot step at the opposite ends thereof is pivotally connected to brackets mounted in said flexible supporting members, said brackets including a yoke having a pin-like projection which is inserted in the supporting member and secured therein by means of a locking element, said yoke carrying between the two free branches thereof an axle stub on which a cage is rotatable mounted, and said cage being joined to the proper foot step.

8. A climbing device of claim 7, wherein said projection has a non-circular sectional shape and is arranged in a tube which is anchored in the supporting member and has the same sectional shape as said projection in order to provide a non-rotatable connection between said foot step and the supporting member in question.

* * * * *